(12) United States Patent
Kalhoff et al.

(10) Patent No.: US 10,320,191 B2
(45) Date of Patent: Jun. 11, 2019

(54) BUS SYSTEM HAVING ALTERNATING VOLTAGE SUPPLY

(71) Applicant: Phoenix Contact GmbH & Co. KG, Blomberg (DE)

(72) Inventors: Johannes Kalhoff, Blomberg (DE); Peter Scholz, Brakel (DE); Lars-Peter Wimmer, Hameln (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 450 days.

(21) Appl. No.: 14/437,123

(22) PCT Filed: Oct. 24, 2013

(86) PCT No.: PCT/EP2013/072307
§ 371 (c)(1),
(2) Date: Apr. 20, 2015

(87) PCT Pub. No.: WO2014/064211
PCT Pub. Date: May 1, 2014

(65) Prior Publication Data
US 2015/0288184 A1 Oct. 8, 2015

(30) Foreign Application Priority Data

Oct. 24, 2012 (DE) .......................... 10 2012 110 172

(51) Int. Cl.
*H02J 1/08* (2006.01)
*H02J 3/02* (2006.01)
(Continued)

(52) U.S. Cl.
CPC ................ *H02J 3/02* (2013.01); *H04L 12/10* (2013.01); *H04L 12/40045* (2013.01); *Y10T 307/258* (2015.04)

(58) Field of Classification Search
CPC ............ H05B 33/0815; H05B 33/0842; H05B 33/0839; H05B 37/0263; H05B 37/0245;
(Continued)

(56) References Cited

U.S. PATENT DOCUMENTS 6,175,932 B1 * 1/2001 Foote .................... G06F 13/409
710/10
6,396,391 B1 * 5/2002 Binder .................... H04L 12/10
307/11

(Continued)

FOREIGN PATENT DOCUMENTS

| CN | 1659487 A | 8/2005 |
| CN | 102415055 A | 4/2012 |

(Continued)

OTHER PUBLICATIONS

"International Application No. PCT/EP2013/072307", "International Search Report and Written Opinion", dated Feb. 26, 2014, Publisher: International Searching Authority / EPO, Published in: NL.

(Continued)

*Primary Examiner* — Sibin Chen
(74) *Attorney, Agent, or Firm* — Kaplan Breyer Schwarz, LLP

(57) ABSTRACT

A communication system comprising a central bus module for providing AC supply voltage, a bus line system connected thereto, and a number of subscriber devices connected to the bus line system, wherein power supply of the electronic part of the subscriber devices is achieved by means of an AC/DC rectifier circuit.

11 Claims, 3 Drawing Sheets

(51) Int. Cl.
*H04L 12/10* (2006.01)
*H04L 12/40* (2006.01)

(58) Field of Classification Search
CPC .......... G06F 13/1684; G06F 13/1689; G06F 13/1694; G06F 13/4086
See application file for complete search history.

(56) References Cited

U.S. PATENT DOCUMENTS

| | | |
|---|---|---|
| 2002/0060918 A1 | 5/2002 | Drobnik |
| 2009/0077808 A1* | 3/2009 | Malm .................. B25J 9/08 29/897 |
| 2012/0045237 A1* | 2/2012 | Aoki ................ G03G 15/1675 399/66 |
| 2013/0147273 A1* | 6/2013 | van der lee ............ H02J 4/00 307/31 |

FOREIGN PATENT DOCUMENTS

| | | |
|---|---|---|
| DE | 19813364 A1 | 11/1998 |
| DE | 10216330 B4 | 1/2007 |
| DE | 19844394 B4 | 9/2010 |
| DE | 102009003846 A1 | 11/2010 |
| DE | 102010016865 A1 | 11/2011 |
| EP | 0355532 A2 | 2/1990 |
| WO | 2011141314 A1 | 11/2011 |

OTHER PUBLICATIONS

"International Application No. PCT/EP2013/072307", "International Search Report", dated Feb. 26, 2014, Publisher: International Searching Authority / EPO, Published in: EP.

"English translation of the International Preliminary Report on Patentability issued in International Application No. PCT/EP2013/072307", May 7, 2015, Publisher: PCT, Published in: EP.

"Office Action" issued in counterpart Chinese Patent Application No. 201380063382.6, dated Jul. 6, 2016, Published in: CN.

* cited by examiner

BUS SYSTEM HAVING ALTERNATING VOLTAGE SUPPLY

FIELD OF THE INVENTION

The invention relates to a communication system between individual subscriber devices and optionally a central data processing unit with power supply via a bus line system.

BACKGROUND OF THE INVENTION

The majority of bus systems available on the market comprise a central bus module that converts the mains AC voltage into a DC voltage and applies this DC voltage to the power supply lines of the bus system. From there, the DC voltage is tapped by the individual subscriber devices of the bus system and is converted into an AC voltage that is fed to a transformer or converter for then being re-converted to a DC voltage, and if necessary regulated, for powering the electronic part of the subscriber device. If a transformer is used, the subscriber devices are galvanically isolated from the central power supply, thereby meeting a requirement often demanded in the application of such devices. On the other hand, in case of many subscribers the total cost and complexity of the communication system is significant, because similar device components have to be provided for each of the subscribers. Subscriber devices usually have an outer housing with an interior that provides only limited space for device components. This is one of the reasons why eliminating device components inside the housing of subscriber devices is desirable.

Thus, the prior art communication system is problematic for such aspects as:
space required for connecting an electronic module within a device housing;
costs and complexity for galvanic isolation within the subscriber device as required according to electrical safety guidelines; or
costs and complexity for power supply to the electronic modules.

DE 198 44 394 B4 discloses a two-conductor bus system for data transfer between stations having transmission and reception circuits, which applies an AC voltage to the bus which is picked up by a power tap and is provided to the station. For data transmission, DC components are superimposed on the AC voltage, with a DC frequency that is smaller than the frequency of the AC voltage.

EP 0 355 532 A2 discloses an arrangement for transfer of data and of a rectified supply voltage via a pair of bus lines, in which each of the subscriber devices is connected to the pair of bus lines via a transformer. The data signals are fed into and extracted from the pair of bus lines via coil-capacitor circuits.

DE 102 16 330 B4 discloses a measuring device for process technology including a bus system in which a central unit feeds a plurality of modules and in which a feedback unit is provided which influences the supply voltage.

DE 10 2009 003 846 A1 discloses a system for non-contact data and power supply to bus subscriber modules that can be arranged side by side on a mounting base. The mounting base comprises a mounting rail and a supply bar, the latter comprising primary-side flat coils which cooperate with shorter secondary-side flat coils of bus subscriber modules. In this way, the bus subscriber modules can be arranged along the supply bar at any location and do not have to rely on latching points of the mounting rail. The primary-side flat coil is supplied with energy and data signals by a gateway configuration, namely inductively via respective coils. From the bus level which presumably includes lines there exists a bus level interface to a gateway module.

DE 10 2010 016 865 A1 discloses a mounting rail bus system comprising a mounting rail and a station bus disposed therein which consists of interconnected bus members. Module-like bus devices can be connected to conductive traces, by contact pins and by a circuit board, for transferring electrical data signals and/or control signals.

DE 198 13 364 A1 discloses a power supply for a control system which comprises a master station and decentralized stations. The master station is powered with AC voltage from the mains which is known to provide 50 or 60 Hz, via a transformer. Two-wire data lines and power supply lines run from the master station to the decentralized stations. There, presumably, the AC voltage is converted into DC voltage for powering electronics in the decentralized stations. The space required for the power supply of the electronic modules within the decentralized stations is considerable.

SUMMARY OF THE INVENTION

The invention is based on the object to provide a communication system which provides for a cost-efficient and space-saving power supply of the subscriber devices.

The features of the embodiments may be combined, as far as technologically feasible.

One aspect of the invention relates to the modular nature of the communication system which is usually designed for a plurality of subscriber devices.

Here, "modular" may mean that the subscriber device can be inserted into the bus system and removed from the bus system without thereby affecting or impairing the functionality of the communication system. "Modular" may further mean that the functionality of the subscriber device can be expanded using expansion cards, so that the subscriber device does not have to be equipped with all functionality already in the manufacturing stage.

The bus system may comprise the following elements:
a support on which the subscriber devices are attached;
a power supply module for providing electric power to the subscriber devices; and
a bus for transferring the electrical supply power and/or data signals to the subscriber devices.

The electrical supply power is preferably provided as a radio frequency voltage so as to enable to keep small the converters or transformers needed for galvanic isolation. In the context of the present invention, radio frequency refers to frequencies in the kilohertz (kHz) range and higher, up into the two-digit megahertz (MHz) range.

Advantageously, only one power supply module is required for all subscriber devices that are connected to the bus. Due to converters or transformers, the subscriber devices can be electrically isolated from the power supply module. At the same time, each subscriber device is capable of communicating with another subscriber device or with the power supply module by transferring messages.

The support may be a profiled rail made of metal which is used for fastening the subscriber devices. Inside the profile of the support rail, line wires may extend which form part of a switching system of the bus system for transferring the supply voltage and/or the communication signals between the subscriber devices.

The support may be configured as a hat rail having a U-shaped profile, for example a TS-35 rail or DIN rail. The hat rail or DIN rail has dimensions of 35×7.5 mm.

The bus system may comprise a flexible cable including wires to which the subscriber devices are connected by an insulation piercing connection or by disconnectable connectors.

The bus system may comprise a plurality of parallel lines to which the subscriber devices are contact-connected and connection modules are formed by this contacting.

The centralized architecture of the bus system according to which the power supply of the subscriber devices with AC voltage, preferably electrical radio frequency (RF) power, is accomplished at a central location by means of the power supply module has a variety of advantages:

- reduced complexity for the power supply of a subscriber, since the power supply unit can be swapped from the subscriber device to the power supply module;
- reduced space requirements for the electronic circuits in the subscriber device;
- if desired, galvanic isolation of the subscriber device from the power supply module;
- reduced complexity for electrically and mechanically coupling a subscriber device to the bus.

Another aspect of the invention relates to a subscriber device for the bus system of the invention, comprising a AC/DC rectifier circuit, preferably an RF-DC converter for power supply of electronic components of the device. The subscriber device may in particular be a measuring device or an automation module.

Advantageously, the power supply for the subscriber can be configured in a particularly space-saving manner, since the conventional DC/RF/DC conversion as provided for example in switching power supplies of existing subscriber devices is not required here.

The following modifications and embodiments of the invention may be combined with each of the aspects of the invention, as far as technologically feasible.

According to one embodiment, the bus may be based on a distribution cable which preferably runs in or is arranged on a support.

The transfer path of the data signal is different from the transfer path of the AC supply voltage. Preferably, the data signal and the AC supply voltage are transmitted on separate lines. The bus system may also be based on a hybrid transfer path which comprises an electrical line and a radio link. For example, the AC supply voltage may preferably be transferred via the electrical line and the data signal via the radio link.

According to one embodiment, one of the subscribers or each subscriber may be configured as an electronic module, preferably a measuring device or a control device, or as an electrical operating means, such as a relay, impulse switch, timer, isolation amplifier, or circuit breaker.

According to one embodiment, the power supply module includes a connection module for connecting the bus line system to the AC supply voltage, which means a galvanic connection between the power supply module and the bus line system. For this purpose, the connection module may be configured as a plug-in connector, a T-bus element, or a T-bus connector, so that the connection is established by electrical contact.

The power supply module may comprise an AC/AC converter or a DC/AC converter in order to provide the AC supply voltage, preferably in the radio frequency range between 100 and 500 kHz.

The bus system comprises a connecting member for connecting the AC supply voltage from the bus to the subscriber device.

The connecting member galvanically connects the AC supply voltage, preferably radio frequency voltage, of the power supply lines of the bus system to the respective subscriber device. For this purpose, the connecting member may be configured as a plug-in connector, a T-bus element, or a T-bus connector, so that an electrical connection is established between the bus lines and the device lines.

The connecting member may be arranged on the support in form of a hat rail.

According to one embodiment, the subscriber device may comprise a data switching module for injecting and extracting the data signal to and from the bus. The data signal and the AC supply voltage (radio frequency voltage) are carried separately in the bus. Within the support, the bus line system may be designed as a switching system of line wires.

The invention will now be explained in more detail by way of exemplary embodiments and with reference to the drawings wherein the same reference numerals designate the same or equivalent elements. The features of different exemplary embodiments may be combined with each other.

DETAILED DESCRIPTION

Figure 1:
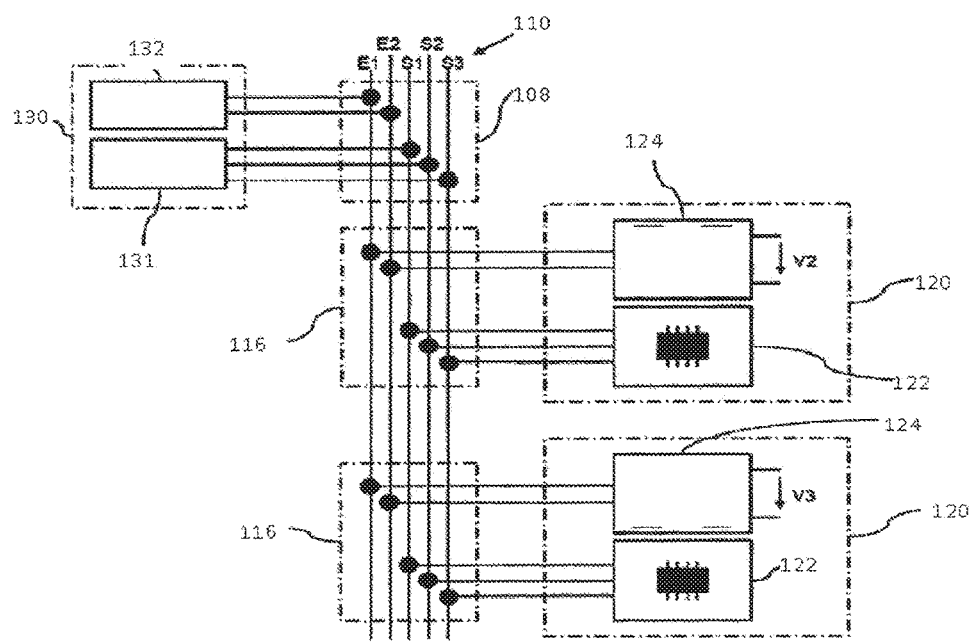
FIG. 1 schematically illustrates a first embodiment of the communication system according to the invention.

FIG. 1 shows a first embodiment of the communication system according to the invention, with a plurality of subscriber devices 120 connected thereto.

The principal constituents of the communication system are a bus line system 110, a central bus module 130, and subscriber devices 120. Central bus module 130 is connected to the bus line system 110 via a connection module 108. One respective connection module 116 is provided for connecting each of the subscriber devices 120 to the bus line system 110. Bus line system 110 includes power supply lines E1 and E2, and signal lines S1, S2, and S3. The central bus module 130 comprises a central power supply unit 132, and optionally a central data processing unit 131 if the bus system is equipped with a central data processing unit. Power supply unit 132 and central data processing unit 131 are connected to the bus line system 110 via connection module 108. Central power supply unit 132 is adapted to apply AC supply voltages to power supply lines E1 and E2. Central data processing unit 131 is used for storing and presenting data for the subscriber devices 120 and may additionally be adapted to control communication.

The unique feature of the invention is that the central power supply unit 132 applies a radio frequency AC supply voltage across power supply lines E1 and E2 and the individual subscriber devices 120 tap this AC supply voltage to supply it to an AC/DC rectifier circuit 124 which provides a rectified supply voltage for the subscriber devices 120. The AC supply voltage should comprise frequencies in the kHz range up to the two-digit MHz range. A range between 100 and 500 kHz is preferred.

Figure 4:
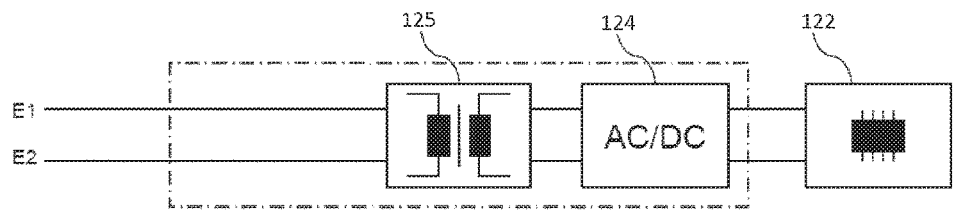
FIG. 4 shows a detail of galvanic isolation.

Each subscriber device 120 further includes at least one electronic module 122 which requires at least one DC voltage for power supply purposes. FIG. 4 schematically illustrates a modular AC/DC rectifier circuit 124 which supplies a suitable direct current to the electronic module 122. Here, the AC/DC rectifier circuit 124 has transformation means 125, also called transformation point, connected upstream thereto, which provides for galvanic isolation of the central bus module 130 from subscriber device 120. Signal lines S1, S2, S3 may likewise be routed via transformation means (not shown) for purposes of galvanic isolation from electronic module 122.

If galvanic isolation is not required, the AC supply voltage may directly be supplied to AC/DC rectifier circuit 124.

Figure 5:
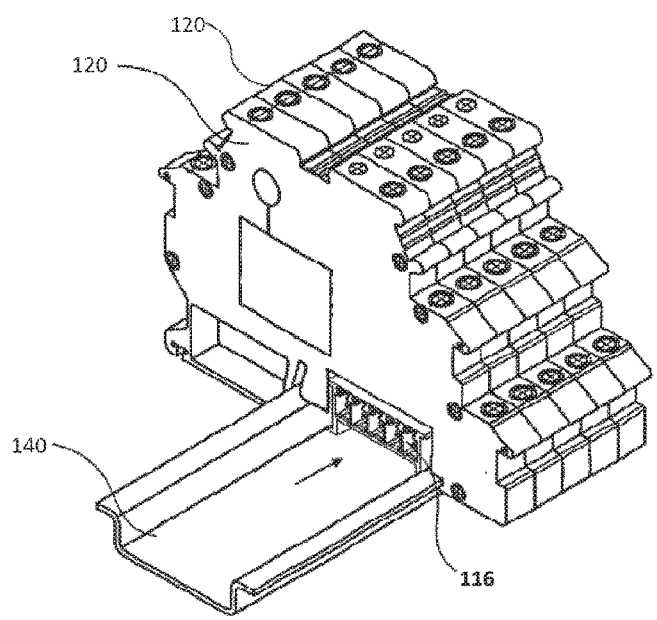
FIG. 5 shows a plurality of subscriber housings plugged to a hat rail.

In practice, subscriber devices 120 are often arranged side by side, in form of plug-in housings (FIG. 5). The devices are fastened by being plugged onto a support, such as the hat rail 140 illustrated. Connectors such as T-bus connector 109 (FIG. 6) which define connection modules 116 in the communication system are particularly suitable for this purpose. Such connectors are terminated to the line wires of power supply lines E1, E2 and signal lines S1, S2, S3 of the bus line system 110 which extends below the T-bus connector 109 along the inside of hat rail 140 (not shown). The central bus module 130 may also be connected to the bus line system 110 via a connection module 108 and fastened to the hat rail 140 as a support. The connection modules 116 arranged side by side form part of the bus line system 110.

Other components of communication subscriber 120 which are not relevant to the invention are not shown in the figures.

The centralized architecture of the communication system, according to which the subscriber devices 120 are supplied with electric AC power from a central location by power supply module 132 allows for considerable space savings in the configuration of the subscriber device 120, since multiple AC voltage conversions as in conventional bus systems are eliminated. Central bus module 130 directly provides AC supply voltage to bus line system 110, thereby avoiding the otherwise usual DC/AC/DC conversion or DC/RF/DC conversion in each subscriber device 120, as is the case in switching power supplies and DC/DC converters, for example.

Figure 2:
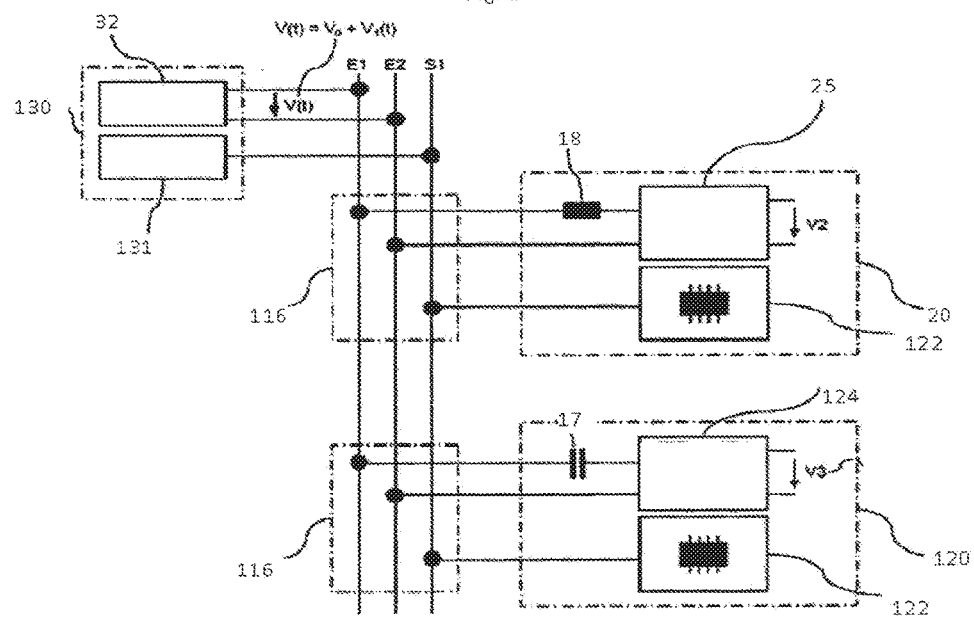
FIG. 2 schematically illustrates a second embodiment of the communication system according to the invention.

FIG. 2 shows a second embodiment of the communication system according to the invention. Here, data transfer is illustrated to be accomplished via one data line S1, although a plurality of data lines may be provided. And, the bus system is intended to additionally enable to connect a conventional subscriber device 20 thereto, which has to be supplied with direct current via lines E1, E2. Such a device 20, if designed for galvanic isolation, comprises a converter module 25 which includes a DC/AC converter, an isolating transformer, and an AC/DC converter. This functionality may also be implemented in a switching power supply with integrated galvanic isolation, as a DC/RF/DC conversion. The bus system of FIG. 2 includes a power supply system 32 which provides an AC supply voltage $V_1(t)$ superimposed by a DC voltage $V_0$. To separate the DC supply current, module 25 has a low-pass filter 18 connected upstream thereto, so that the conventional device 20 can be connected to the novel bus system, too.

Subscriber device 120 can be connected to the bus system of FIG. 2 via a high-pass filter 17, since the latter will pass the alternating voltages of power supply system 32.

As described with reference to FIGS. 1 and 2, the invention relates to a multi-line bus system having separate power lines E1, E2 and data or signals lines S1, S2, S3. At least two lines E1, E2 are used for power supply. The supply power comprises at least an AC component, as given by the formula $V(t)=V_0+V_1(t)$. At least one line S1 is provided for data/signal transfer. The data transfer may have separate power supply lines. In the preferred embodiment, the bus system comprises connection modules which consist of identical pluggable members. The connection modules are contacted through plug-in connections. The power supply may be configured as a two-wire system, but it is also possible to use a symmetrical three-wire system.

The AC supply voltage provided by central power supply unit 132 may be a sinusoidal 50 Hz voltage. Other periodic voltage waveforms such as rectangular or trapezoidal voltage waveforms may likewise be used. Voltage waveforms including different combinations of different frequency components may be used. The frequencies used are in the kHz range up to the two-digit MHz range, preferably in a range from 100 to 500 kHz. For this frequency range, system components such as transformers and power electronics are manufactured particularly cost-efficiently and with low space requirements.

As described above, a DC voltage may be superimposed on the AC supply voltage. In the present context, the term "AC" is intended to encompass even a non-periodic signal which may include, for example, stochastic components. Usually, however, periodic AC supply voltages having sinusoidal, trapezoidal, or rectangular basic shapes will be preferred.

The architecture of the communication system is shown in FIG. 1 and FIG. 2. Central power supply unit 132 converts the input voltage provided, e.g. mains voltage, into the AC supply voltage (e.g. 6 V at 200 kHz). This AC supply voltage and the data signals are provided on the respective lines E1, E2, and S1, S2, S3 of the bus line system 110. By means of plug-in connectors (FIG. 6, T-bus connector 109) the AC supply voltage and the data signals are supplied to the individual subscriber devices 120. Within subscriber devices 120, AC/AC converters 125 may be provided for galvanic isolation, which converters comprise a transformer or coupled coils. Each of converters 125 may have different voltage levels and potential groups, by choosing coils with different numbers of turns for implementing the transformer 125.

Alternatively, the AC supply voltage may be tapped via a capacitive interface.

With or without galvanic isolation, rectification is accomplished in AC/DC rectifier circuit 124. If necessary, readjustments may be made in order to supply direct current to the electronic components 122 of subscriber device 120.

The advantage of the architecture according to the invention is that the DC/AC conversion of conventional subscriber devices 20 is swapped to the central bus module 130, so that DC/AC conversion is performed only once. This swap saves space within the housings of subscriber devices 120, and costs can be reduced.

Figure 3:
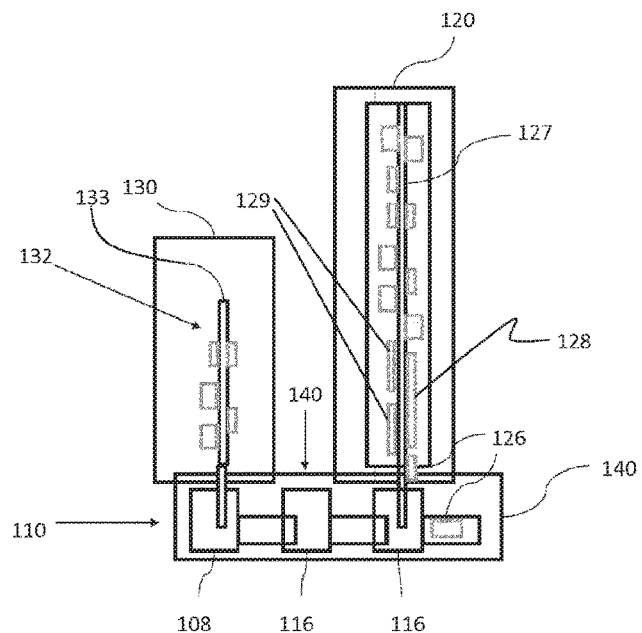
FIG. 3 illustrates details of the communication system according to the invention.

FIG. 3 shows details of the communication system according to the invention. Central bus module 130 includes the main power supply unit 132 which is capable of converting the mains voltage or another applied voltage into the AC supply voltage which is fed into the bus line system 110. Power supply unit 132 comprises a circuit board 133 including conductors that are electrically connected to a connection module 108. Connection module 108 forms part of the bus line system 110, together with the other connection modules 116.

FIG. 3 also illustrates a subscriber device 120. The latter is connected to a connection module 116, bridging another connection module 116. (Not every connection module 116 supplies an associated subscriber device.) The illustrated subscriber device 120 comprises an equipped circuit board 127 carrying a primary coil 128 and two secondary coils 129 which extract the AC supply voltage for the subscriber device 120 from the bus line system 110. If it has to be expected that the AC supply voltage is disturbed by parasitic influences, auxiliary electronics may be provided as controlling devices 126 which have a regulating effect on the extraction of the supply voltages.

The number of connection modules 116 may correspond to the number of subscriber devices 120, i.e. each connection module 116 may have a subscriber device 120 connected thereto, but this is not mandatory. It is also possible that one connection module 116 supplies a plurality of subscriber devices, provided it is adapted accordingly.

FIG. 4 shows one possible implementation detail for FIG. 1, namely the power supply of electronic module 122 with galvanic isolation from the central power supply unit 132 using AC/AC converter 125 which supplies power to the AC/DC rectifier circuit 124 which in turn supplies power to electronic module 122.

FIG. 5 shows a hat rail 140 which serves as a support for individual subscriber devices 120 that are plugged side by side onto hat rail 140. Not shown are the power supply lines and signal lines of the bus line system, which extend between the bottom side of subscriber devices 120 or the T-bus connector 109 and the rail base along the inside of hat rail 140. Connection module 116 or T-bus connector 109 engages and contacts the individual wires of the bus line system 110.

Figure 6:
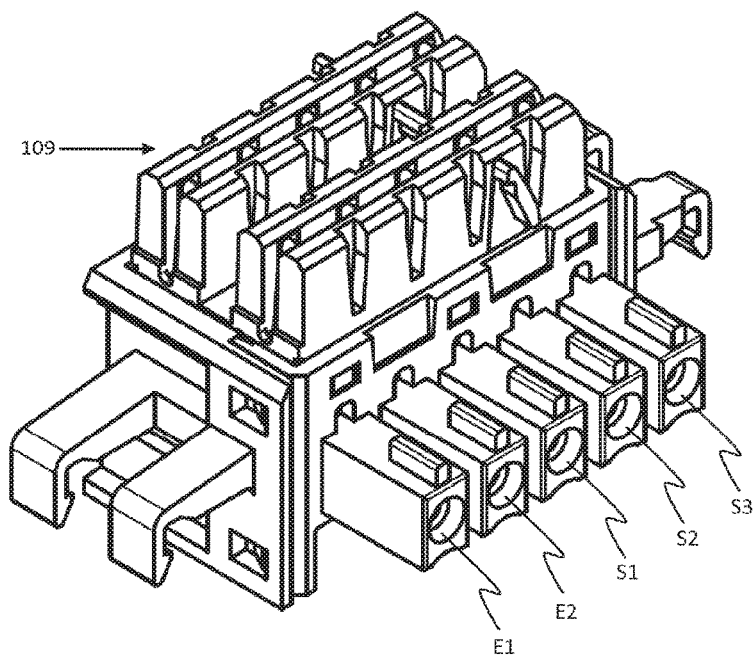
FIG. 6 shows a T-bus connector.

The T-bus connector illustrated in FIG. 6 may likewise be considered as being part of the subscriber device, with connecting lines additionally extending between the illustrated plug-in connector and the complete device 120.

FIG. 6 illustrates a T-bus connector 109 which may be used as a connection module 116. The housing shown has an insertion slot for an electronic card which for example forms a substantial part of the central bus module 130. Indicated are lines E1, E2, S1, S2, and S3, which extend from the central bus module 130 and terminate in passages that extend along the inside of hat rail 140 when the T-bus connector 109 is coupled to such a hat rail 140.

The following benefits are achieved:
common AC voltage power supply of all subscriber devices 120 connected to the bus line system 110;
use of existing distribution systems such as the Phoenix Contact T-bus;
elimination of the primary power supply unit from each electronic subscriber device as compared to conventional subscriber devices;
easy termination and connection/disconnection of the supply of electronic subscriber devices by plugging into/unplugging from the bus system, which is a switching system of bus lines;
standardization of the feed electronics of subscriber devices; and
standardization of the control electronics of the central bus module.

The system may be applied both in mechanically rigid systems, such as e.g. a DIN rail, and in flexible wired systems (such as e.g. round/flat cables with piercing terminals, disconnectable plug-in connectors).

REFERENCE NUMERALS

17 High-pass filter
18 Low-pass filter
20 Conventional subscriber device
25 Converter module
32 Power supply system
108 Connection module
109 T-bus connector
110 Bus line system
116 Connection module
120 Subscriber device
122 Electronic module
124 AC/DC rectifier circuit
125 AC/AC converter, transformation point
126 Control device
127 Equipped circuit board
128 Primary coil
129 Secondary coil
130 Central bus module
131 Central data processing unit
132 Central power supply unit
133 Circuit board
140 Support rail, hat rail
E1, E2 Power supply lines
S1-S3 Signal lines

What is claimed is:

1. A communication system, comprising:
a bus line system including separate power supply lines and signal lines;
at least one central bus module including a central power supply unit connected to the bus line system via power supply lines, wherein the central power supply unit is adapted for supplying AC supply voltages at frequencies in a kHz range and higher up into a two-digit MHz range to the power supply lines, wherein the central power supply unit directly supplies the AC supply voltages to the power supply lines;
a number of subscriber devices, each one thereof comprising at least one electronic module and being capable of communicating with each other via the signal lines and being connected to the power supply lines;
wherein each subscriber device includes an AC/DC rectifier circuit, the AC/DC rectifier circuit comprising a HF(high frequency)/DC converter, the AC/DC rectifier circuit adapted for converting the AC supply voltages of the kHz range and higher up to the two-digit MHz range into DC supply voltages suitable for the associated electronic module to provide them to the electronic module.

2. The communication system as claimed in claim 1, further comprising a support for accommodating the power supply lines and for fastening the subscriber devices side by side, wherein the support has connection modules arranged side by side thereon, which are adapted for connecting the subscriber devices to the bus line system.

3. The communication system as claimed in claim 2, wherein the connection modules arranged side by side form part of the bus line system.

4. The communication system as claimed in claim 2, wherein at least some of the connection modules are accommodated in an intermediate space of a supporting hat rail that defines the support and are physically connected to a respective T-bus connector.

5. The communication system as claimed in claim 1, wherein a control device is provided for processing and for level control of the AC supply voltage.

6. The communication system as claimed in claim 1, wherein the electronic module of a subscriber device is connected to the signal lines on its input side and output side and is connected to the associated AC/DC rectifier circuit on its power supply side.

7. The communication system as claimed in claim 1, wherein a flexible cable is provided as part of the bus line system and serves as a carrier for connecting lines to the subscriber devices.

8. The communication system as claimed in claim 1, wherein transformation means are connected upstream of the AC/DC rectifier circuit.

9. The communication system as claimed in claim 1, wherein the AC supply voltage supplied by the central power supply unit is in a range from 100 to 500 kHz.

10. The communication system as claimed in claim 1, wherein the AC supply voltage has a DC component superimposed thereon.

11. The communication system as claimed in claim 1, wherein the central bus module comprises a central data processing unit which is connected to the signal lines.

* * * * *